(12) United States Patent
Urbach

(10) Patent No.: US 6,773,197 B2
(45) Date of Patent: Aug. 10, 2004

(54) BALL JOINT

(75) Inventor: Brian A. Urbach, Rochester Hills, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 10/215,461

(22) Filed: Oct. 9, 2002

(65) Prior Publication Data

US 2004/0071501 A1 Apr. 15, 2004

(51) Int. Cl.$^7$ .............................................. F16D 1/12
(52) U.S. Cl. ........................................................ 403/135
(58) Field of Search ................................ 403/122, 135, 403/136, 137, 138, 141, 142, 143

(56) References Cited

U.S. PATENT DOCUMENTS

| | | |
|---|---|---|
| 3,357,728 A | 12/1967 | Melton et al. |
| 3,944,376 A | 3/1976 | Hata |
| 4,095,580 A | 6/1978 | Murray et al. |
| 4,231,673 A | 11/1980 | Satoh et al. |
| 4,324,501 A | 4/1982 | Herbenar |
| 4,412,151 A | 10/1983 | Norris |
| 4,508,079 A | 4/1985 | Komurasaki et al. |
| 4,658,650 A | 4/1987 | Yorinaga et al. |
| 4,725,159 A | 2/1988 | Wood, Jr. |
| 5,178,482 A | 1/1993 | Wood |
| 5,230,580 A | 7/1993 | Henkel |
| 5,630,672 A | 5/1997 | McHale |
| 5,697,723 A | 12/1997 | Wood |
| 5,795,092 A * | 8/1998 | Jaworski et al. ........ 403/135 X |
| 5,799,968 A | 9/1998 | Loeffler |
| 6,082,720 A * | 7/2000 | Ducloux et al. ............ 267/221 |
| 6,138,654 A | 10/2000 | Pretorius et al. |
| 6,301,761 B1 | 10/2001 | Brenner et al. |
| 6,307,300 B1 | 10/2001 | Yamamoto et al. |
| 2003/0081989 A1 * | 5/2003 | Kondoh ....................... 403/135 |

OTHER PUBLICATIONS

M.V. Gandhi, et al., "Smart Materials and Structures", pp. 175–191 (1992).

A.V. Srinivasan, et al. Smart Structures (Analysis and Design), pp. 7–25, (2001).

* cited by examiner

Primary Examiner—John R. Cottingham
(74) Attorney, Agent, or Firm—Tarolli, Sundheim, Covell & Tummino L.L.P.

(57) ABSTRACT

An apparatus (12) includes a housing (142), a ball stud (170), a first bearing layer (110), and a second vibration dampening layer (120 or 130). The housing (142) defines a chamber (160) and has an opening (147) in communication with the chamber (160). The ball stud (170) has a ball portion (172) located in the chamber (160) and a stud portion (174) extending from the ball portion (172) through the opening (147). The ball portion (172) has a center (180). The stud portion (174) has a longitudinal axis (181) intersecting the center (180). The first bearing layer (110) is disposed in the chamber (160) and engages the ball stud (170). The ball stud (170) is rotatable about the center (180) relative to the first bearing layer (110). The second vibration dampening layer (120 or 130) dampens vibration transmitted between the housing (142) and the ball stud (170).

15 Claims, 2 Drawing Sheets

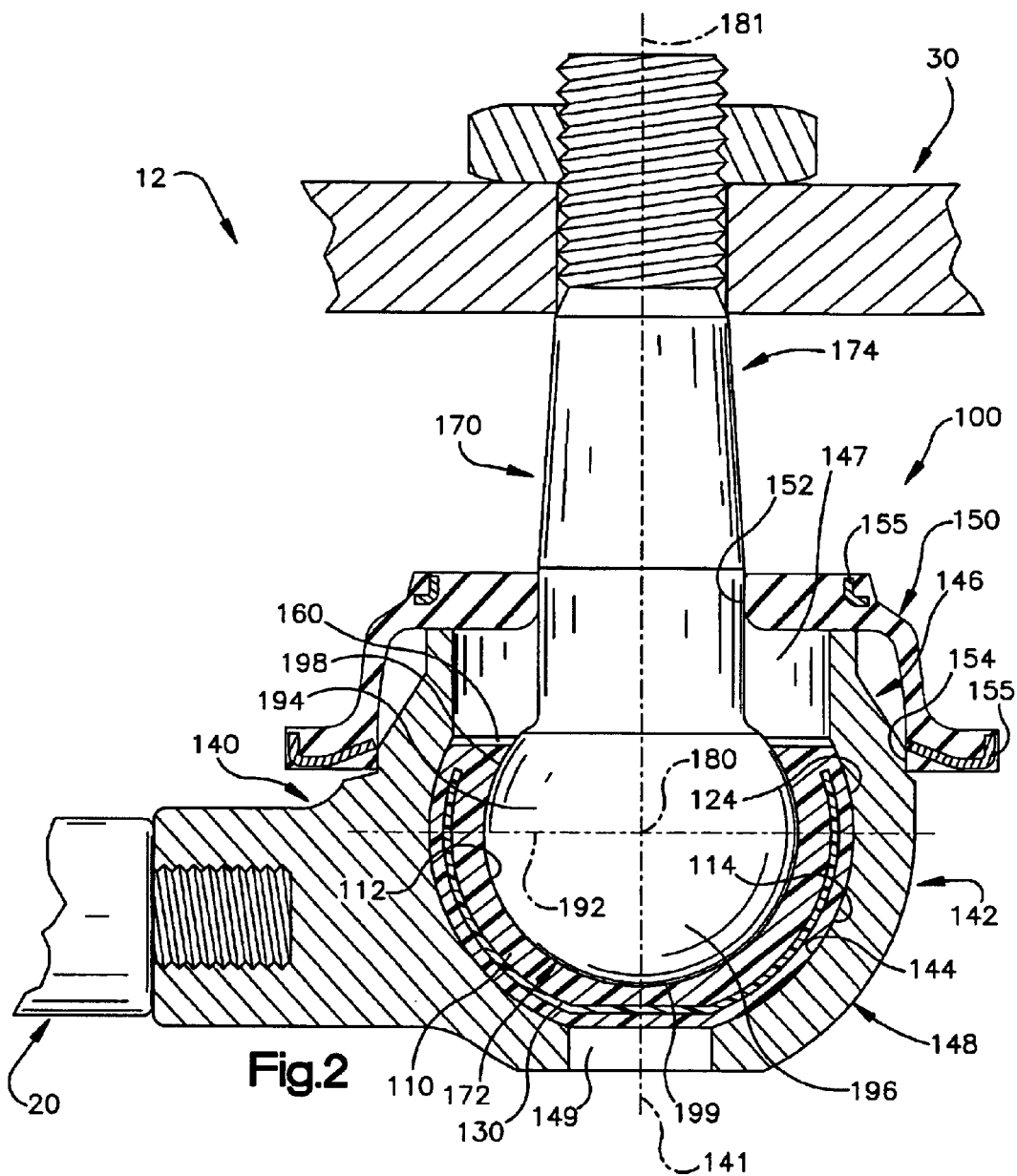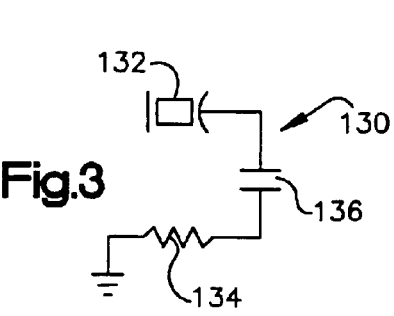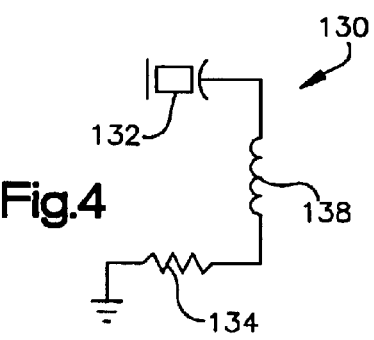

BALL JOINT

BACKGROUND OF THE INVENTION

1. Technical Field

The present invention relates to a ball joint for connection between two relatively movable parts, and more particularly, to a ball joint for connection between a steerable vehicle wheel and a rack of a rack and pinion steering gear.

2. Description of the Prior Art

A conventional ball joint includes a ball stud in a socket. A bearing is interposed between a ball portion of the ball stud and the socket. The ball stud and socket move relative to each other. A ball joint may be used in a number of different ways. In some uses of a ball joint, undesirable vibration may be transferred through the ball joint.

A ball joint is typically associated with a steering mechanism and transmits force between the steering mechanism and a steered wheel of a vehicle. Thus, the ball joint transfers vibration from the steered wheel to the steering gear. Accordingly, road shocks are transmitted from a steerable wheel of the vehicle through the ball joint to the steering gear. This vibration may be transmitted to a steering wheel of the vehicle and be objectionable to a vehicle operator.

SUMMARY OF THE INVENTION

In accordance with one feature of the present invention, an apparatus includes a housing, a ball stud, a first bearing layer, and a second vibration dampening layer. The housing defines a chamber and has an opening in communication with the chamber. The ball stud has a ball portion located in the chamber and a stud portion extending from the ball portion through the opening. The ball portion has a center. The stud portion has a longitudinal axis intersecting the center. The first bearing layer is disposed in the chamber and engages the ball stud. The ball stud is rotatable about the center relative to the first bearing layer. The second vibration dampening layer dampens vibration transmitted between the housing and the ball stud.

In accordance with another feature of the present invention, an apparatus includes a housing, a ball stud, a first bearing layer, and a second vibration dampening layer. The housing defines a chamber. The housing has an opening in communication with the chamber. The ball stud has a spherical ball portion located in the chamber and an elongate stud portion extending from the ball portion through the opening. The ball portion has a center and a partially spherical outer surface. The stud portion has a longitudinal axis intersecting the center. The first bearing layer has an inner spherical surface and an outer spherical surface. The first bearing layer is disposed in the chamber. The inner spherical surface of the first bearing layer engages the outer spherical surface of the ball portion. The ball portion is slidable relative to the first bearing layer. The second vibration dampening layer dampens vibration transmitted between the housing and the ball stud. The second vibration dampening layer has an inner spherical surface. The inner spherical surface of the second vibration dampening layer engages the outer spherical surface of the first bearing layer.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 2 is a schematic partial sectional view of a ball joint in accordance with another feature of the present invention;

FIG. 3 is a schematic view of a circuit for use with the ball joint of FIG. 2; and FIG. 4 is a schematic view of another circuit for use with the ball joint of FIG. 2.

DETAILED DESCRIPTION OF AN EXAMPLE EMBODIMENT

Figure 1:
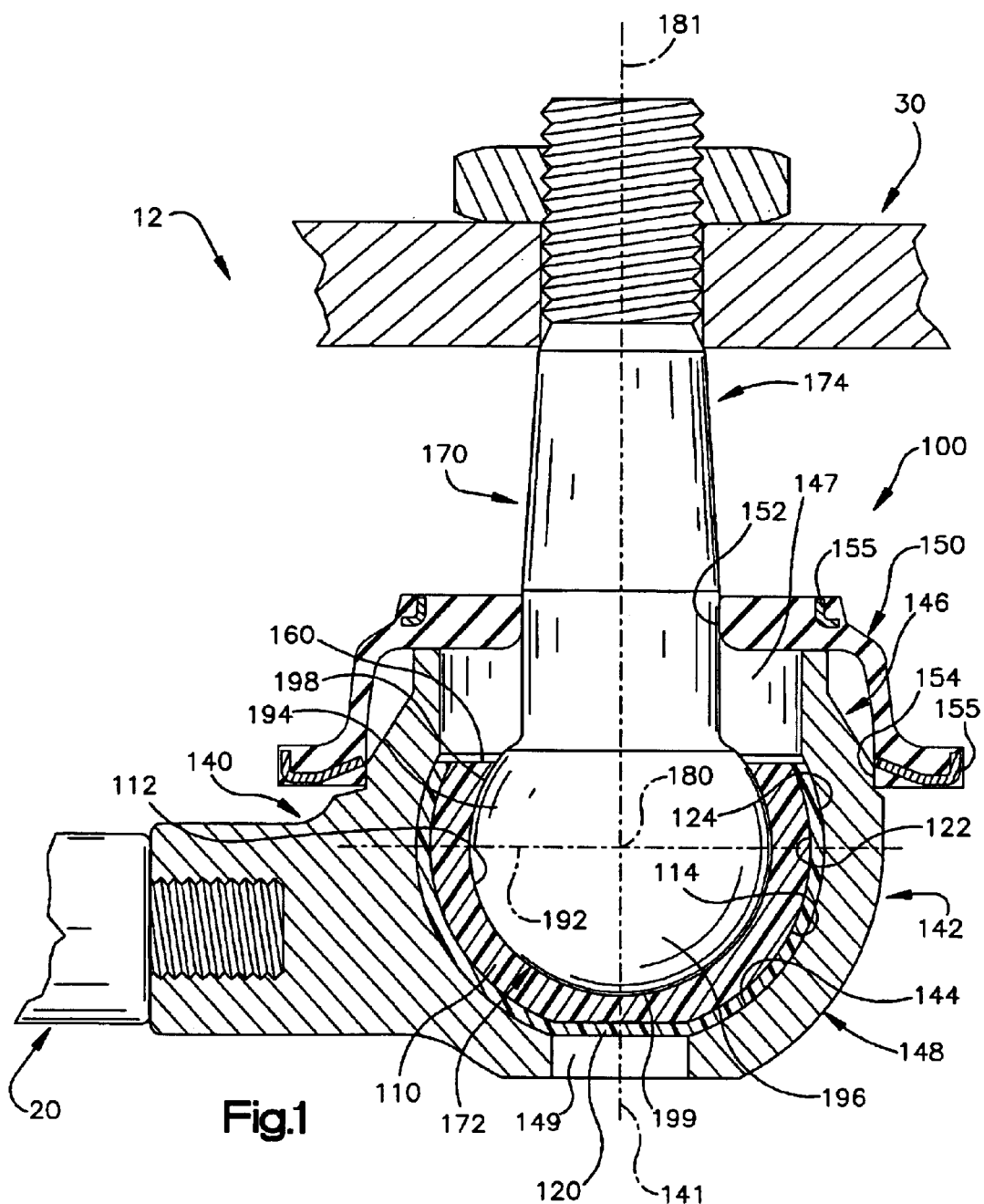
FIG. 1 is a schematic partial sectional view of a ball joint in accordance with one feature of the present invention.

The present invention relates to a ball joint for use in various applications. One application may be in a steering system for a vehicle. The ball joint may connect a steerable vehicle wheel to a rack of a rack and pinion steering gear.

In accordance with one feature of the present invention, as shown in FIG. 1, a steering apparatus 12 includes a tie rod 20 and a steering knuckle 30 connected to each other by a ball joint 100. The tie rod 20 may be connected to a rack of a rack and pinion steering gear (not shown). The steering knuckle 30 may be part of a steering linkage for effecting steering movement of a steerable wheel of a vehicle. Upon movement of the tie rod 20 by the steering gear, a steerable wheel of the vehicle may be turned by the steering knuckle 30. The steering apparatus 12 may further include a hydraulic power assist system (not shown) that is operable in a known manner, upon rotation of a vehicle steering wheel, to move the rack to effect steering movement of the steerable wheel of the vehicle.

The tie rod 20 is typically threaded into a threaded bore of the ball joint 100. The steering knuckle 30 is typically connected to a threaded end of the ball joint 100 by a nut.

The ball joint 100 (FIG. 1) includes a socket 140. The socket 140 is typically made as one piece, preferably from metal. The socket 140 defines a housing 142 having a generally spherical inner wall 144 centered on an axis 141 of the socket 140. The housing 142 has an upper end portion 146 and a lower end portion 148 opposite the upper end portion. The upper end portion 146 has a first opening 147 centered on the axis 141. The lower end portion 148 has a second smaller access opening 149 centered on the axis 141. The spherical inner wall 144 of the housing 142 defines a chamber 160 in the housing extending between the first opening 147 and the second opening 149.

The ball joint 100 also includes a ball stud 170. The ball stud 170 has a spherical ball portion 172 located in the chamber 160 in the housing 142. A stud portion 174 of the ball stud 170 extends from the ball portion 172 upward through the first opening 147 in the housing 142 and out of the chamber 160. The stud portion 174 of the ball stud 170 has an elongate, cylindrical configuration centered on an axis 181. The axis 181 of the stud portion 174 forms an axis of the ball stud 170.

The ball portion 172 of the ball stud 170 has a center 180 of rotation. The ball stud axis 181 and the socket axis 141 both extend through (intersect) the center 180 of rotation of the ball portion 172 of the ball stud 170. The ball portion 172 of the ball stud 170 has an equator 192. The equator 192 extends through the center 180 of rotation of the ball portion 172 and extends perpendicular to the axes 141, 181.

The equator 192 divides the ball portion 172 into first (upper) and second (lower) hemispheres 194, 196, respectively. The first hemisphere 194 is located adjacent the first opening 147 of the housing 142 and has a first spherical outer surface 198. The second hemisphere 196 is located adjacent the second opening 149 of the housing 142 and has a second spherical outer surface 199. The first outer surface 198 of the first hemisphere 194 and the second outer surface 199 of the second hemisphere 196 together form the spherical outer surface of the ball portion 172 of the ball stud 170.

The ball joint 100 further includes a spherical bearing layer 110. The bearing layer 110 is preferably made from a suitable polymer, such as nylon. Thus, the bearing layer is made of a hard plastic material. The bearing layer 110 is located in the chamber 160 defined by the housing 142 and adjacent to the ball portion 172. The bearing layer 110 has a concave spherical inner surface 112 and slidingly engages the first and second outer surfaces 198, 199 of the ball portion 172.

The bearing layer 110 further has a spherical outer surface 114 for engagement with a spherical vibration dampening layer 120, or vibration attenuation layer. The vibration dampening layer 120 has a concave spherical inner surface 122 that is bonded by a suitable adhesive to the outer surface 114 of the bearing layer 110. The vibration dampening layer 120 further has a convex spherical outer surface 124 for engaging the spherical inner wall 144 of the chamber 160. The vibration dampening layer 120 is made of a suitable vibration dampening material, such as rubber. The vibration dampening layer 120 is thus a flexible, compressible, resilient layer of material.

FIG. 1 illustrates the ball joint 100 in a "neutral" condition, that is, a condition in which no steering force is being applied to the socket 40 by the tie rod 20 or the steering knuckle 30. The ball stud 170 may cyclically pivot (rotate) about the center 180 of rotation up to 21 degrees, for example, in any direction. Since the vibration dampening layer 120 is a flexible, resilient material, the layer may be sized such that the layer is compressed when placed between the ball portion 172 and the housing 142.

The ball joint 100 further includes a boot seal 150 for preventing external objects from entering the chamber 160. The boot seal 150 is typically made from a suitable elastomeric material, such as rubber. The boot seal 150 has an upper opening 152 through which the stud portion 174 extends. The boot seal 150 sealingly engages the stud portion 174 of the ball stud 170 at the upper opening 152 of the boot seal. The flexibility of the boot seal 150 allows the upper part of the boot seal to deflect and move with the stud portion 174 of the ball stud 170 during pivoting of the ball stud 170 relative to the socket 140. The boot seal 150 further has a lower opening 154 through which the upper end portion 146 of the socket 140 extends. The boot seal 150 sealingly engages the upper end portion 146 of the socket 140.

As viewed in FIG. 1, the boot seal 150 may have a barrel-like configuration and snap onto the upper end portion 146 of the socket 140 to fix the boot seal to the socket. The boot seal 150 may also have metal reinforcing members 155 for strengthening the connections to the stud portion 174 and the socket 140.

As the steerable wheel encounters cyclic changes in a road surface, the steerable wheel will cyclically move, i.e., vibrate. This vibration of the steerable wheel will be transferred through the steering knuckle 30 to the ball stud 170. The ball stud 170 will transfer the vibration to the housing 142 and the socket 140. The elastic nature of the vibration dampening layer 120 allows some of this vibration to be absorbed by a change in thickness of the vibration dampening layer (i.e., the layer compressing in one area and the layer expanding in another diametrically opposed area).

Thus, the vibration transferred from the ball stud 170 to the socket 140 is lessened and absorbed.

In accordance with another feature of the present invention, a vibration dampening layer may be an electrical circuit matrix 130 molded into the bearing layer 110. Thus, the circuit matrix 130 is embedded in the bearing layer 110. The circuit matrix 130 includes one or more piezoelectric crystal(s) 132. Each crystal 132 may be electrically connected to a resistor 134 and a capacitor 136 or an inductor 138.

Vibration occurring between the socket 140 and the ball stud 170 transfers varying radial pressure loads to the bearing layer 110. The pressure loads create some mechanical deformation in the crystals 132 in the bearing layer 110. The mechanical deformation of the crystals 132 thus attenuates some of the vibration. Electric dipoles are generated and an electrical potential difference develops that is dependent upon the changing deformations. Hence, electromotive force is produced, and an associated electric current is developed by the piezoelectric crystals 132, as a function of the continuously changing mechanical deformations. Vibration attenuation within the bearing layer 110 of the ball joint 100 occurs due to the oscillating strain of the piezoelectric materials.

The electrical response of the piezoelectric crystals 132 is dependent upon the direction of external mechanical loads, and hence stresses and strains, relative to a set of axes fixed in the crystals. Because of the spherical shape of the vibration dampening layer 110 and the ball portion 174, the relevant pressure axes will be radial and may pass through the center of the ball portion.

Suitable piezoelectric materials that may be used are piezoceramics, such as the lead zirconate titanates (PZT), and piezopolymers, such as the polyvinylidene fluorides (PVDF). Both classes of materials are available in a broad range of properties to suit the particular dynamic properties of the ball joint 100.

Each crystal 132 may be cut in order to generate a current at certain predetermined pressure frequency ranges. Those pressures that match the predetermined pressure frequency range of a crystal 132 would generate an electric current in either the resistance-capacitance circuit (FIG. 3) or the resistance-inductance circuit (FIG. 4). Resistance-capacitance circuits are typically used for high frequency attenuation and resistance-inductance circuits are typically used for low frequency attenuation. The vibration energy is dissipated through the conversion of the mechanical pressure variations in the crystal(s) 132 to heat generated by the electric current in the resistor(s) 134. The matrix 130 may comprise one or more of the circuits illustrated in FIGS. 3 and 4 in any combination. The circuits may be disposed at various locations around the perimeter of the ball portion 172 of the ball stud 170. When the pressure caused by the vibration subsides, the crystals in the matrix 130 return to their initial condition and generate no electric current.

As viewed in FIG. 3, a resistance-capacitance circuit for a crystal 132 may include the piezoelectric crystal in series with a capacitor 136 and a resistor 134. The electric current created by the mechanical pressure variations to the crystal 132 is stored as voltage in the capacitor 136 until it can be dissipated as heat in the resistor 134. The resistance value of the resistor 134 may be tailored for the optimal cyclic timing of this dissipation effect.

For example, for high frequency vibration attenuation, a resistor having a high resistance value may be used. Because of the high resistance, a larger amount of heat will be generated by the resistor 134 for a single current cycle than by a lower resistance. As a result, the temperature difference between the resistor 134 and the surrounding bearing layer 110 will be larger than if a resistor with a lower resistance value were used. Since larger temperature differences dissipate heat more quickly than lower temperature differences, more heat will be transferred away from the higher resistance resistor 134 in a shorter amount of time than if a resistor with a lower resistance value were used. Thus, the resistor 134 will dissipate a satisfactory amount of heat during a single current cycle and will not become too hot and fail during subsequent current cycles.

As viewed in FIG. 4, the resistance-inductance circuit for a crystal 132 may include the piezoelectric crystal in series with an inductor 138 and a resistor 134. The electric current created by the mechanical pressure variations to the crystal 132 is stored as current in the inductor 138 until it can be dissipated as heat in the resistor 134. The resistance value of the resistor 134 may be tailored for the optimal cyclic timing of this dissipation effect, as described above.

From the above description of the invention, those skilled in the art will perceive improvements, changes and modifications in the invention. Such improvements, changes and modifications within the skill of the art are intended to be covered by the appended claims.

Having described the invention, the following is claimed:

1. An apparatus comprising:
   a housing defining a chamber, said housing having an opening in communication with said chamber;
   a ball stud having a ball portion located in said chamber and a stud portion extending from said ball portion through said opening, said ball portion having a center and a partially spherical outer surface, said stud portion having a longitudinal axis intersecting said center;
   a first bearing layer disposed in said chamber, said first bearing layer having a partially spherical inner surface engaging said ball stud, said ball stud being rotatable about said center relative to said first bearing layer, said spherical outer surface of said ball portion being slidable relative to said spherical inner surface of said first bearing layer; and
   a second vibration dampening layer for dampening vibration transmitted between said housing and said ball stud.

2. The apparatus as set forth in claim 1 wherein said second vibration dampening layer dampens vibration in a frequency range, said second vibration dampening layer including a piezoelectric crystal that generates electrical current in response to vibration in said frequency range, said piezoelectric crystal being in a circuit embedded in said first bearing layer that dissipates said electric current in the form of heat.

3. The apparatus as set forth in claim 1 wherein said second vibration dampening layer comprises a layer of compressible resilient material bonded to an outer surface of said first bearing layer.

4. The apparatus as set forth in claim 1 wherein said ball portion includes an upper hemisphere and a lower hemisphere, said first bearing layer slidably engaging outer surfaces of both said upper hemisphere and said lower hemisphere.

5. The apparatus as set forth in claim 1 further including a tie rod for connecting to a steering gear and a steering knuckle for connecting to a vehicle steering linkage.

6. The apparatus as set forth in claim 5 further including a threaded bore for connecting the tie rod to said housing.

7. The apparatus as set forth in claim 5 wherein said stud portion has a threaded end for connecting to said steering knuckle.

8. An apparatus comprising:
   a housing defining a chamber, said housing having an opening in communication with said chamber;
   a ball stud having a spherical ball portion located in said chamber and an elongate stud portion extending from said ball portion through said opening, said ball portion having a center and a partially spherical outer surface, said stud portion having a longitudinal axis intersecting said center;
   a first bearing layer having an inner spherical surface and an outer spherical surface, said first bearing layer being disposed in said chamber, said outer spherical surface of said ball portion being slidable relative to said inner spherical surface of said first bearing layer; and
   a second vibration dampening layer for dampening vibration transmitted between said housing and said ball stud, said second vibration dampening layer having an inner spherical surface, said inner spherical surface of said second vibration dampening layer engaging said outer spherical surface of said first bearing layer.

9. The apparatus as set forth in claim 8 wherein said second vibration dampening layer dampens vibration, in a frequency range, said second vibration dampening layer including a piezoelectric crystal that generates electrical current in response to vibration in said frequency range, said piezoelectric crystal being in a circuit embedded in said first bearing layer that dissipates said electric current in the form of heat.

10. The apparatus as set forth in claim 8 wherein said second vibration dampening layer comprises a layer of compressible resilient material bonded to an outer surface of said first bearing layer.

11. The apparatus as set forth in claim 8 wherein said vibration dampening layer includes a circuit matrix.

12. The apparatus as set forth in claim 11 wherein said circuit matrix includes a plurality of piezoelectric crystals and a resistor corresponding to each of said plurality of piezoelectric crystals.

13. The apparatus as set forth in claim 12 wherein said circuit matrix further includes a capacitor corresponding to each of said plurality of piezoelectric crystals.

14. The apparatus as set forth in claim 12 wherein said circuit matrix further includes an inductor corresponding to each of said plurality of piezoelectric crystals.

15. An apparatus comprising:
   a housing defining a chamber, said housing having an opening in communication with said chamber;
   a ball stud having a ball portion located in said chamber and a stud portion extending from said ball portion through said opening, said ball portion having a center, said stud portion having a longitudinal axis intersecting said center;
   a first bearing layer disposed in said chamber and engaging, said ball stud, said ball stud being rotatable about said center relative to said first bearing layer; and
   a second vibration dampening layer for dampening vibration transmitted between said housing and said ball stud, said second vibration dampening layer including a circuit matrix.

* * * * *